United States Patent

[11] 3,630,467

[72] Inventors Tadao Hayami;
   Atsutada Nakatani, both of Tokyo, Japan
[21] Appl. No. 22,834
[22] Filed Mar. 26, 1970
[73] Assignee Kabushiki Kaisha Koparu
[32] Priority Mar. 31, 1969
[33] Japan
[31] 44/24614

[54] AUTOMATIC FILM-REWINDING DEVICE FOR PROJECTOR
4 Claims, 7 Drawing Figs.

[52] U.S. Cl. .................................................. 242/186,
   242/205, 352/166
[51] Int. Cl. .................................................... B65h 59/38,
   G03b 1/04, G11b 15/32
[50] Field of Search ....................................... 242/186–190,
   205; 352/166, 191–197

[56] References Cited
UNITED STATES PATENTS
| | | | |
|---|---|---|---|
| 2,685,415 | 8/1954 | Wittel et al. | 242/205 |
| 3,016,210 | 1/1962 | Ecker et al. | 242/205 |
| 3,240,550 | 3/1966 | Mitchell et al. | 352/124 |
| 3,429,518 | 2/1969 | McKee | 242/186 |

Primary Examiner—Leonard D. Christian
Attorney—Otto John Munz

ABSTRACT: In a sprocketless-type projector, the film having been wound around a takeup reel can be automatically rewound on a supply reel upon completion of the projection without changing the direction of rotation of the driving motor and without virtually changing the path followed by the film during the projection, by the provision of an automatic film-rewinding device structure and operative so that the members adapted to be actuated by the tension produced in the film between the claw and the supply reel to which the terminal end of the film is fixed cause both the pressure plate and the claw to retreat from the film face and at the same time cause the swingable plate having two idlers to effect reverse shifting of its position to switch over the transmission of rotation of the motor from the state of being effected through only one of the two idlers to the state of being effected through both these two idlers to thereby transmit the rotation of the motor to the shutter shaft coupled to the shaft of the supply reel.

Patented Dec. 28, 1971

INVENTORS
TADAO HAYAMI,
ATSUTADA NAKATANI

BY *Otto John Munz*

ATTORNEY

Patented Dec. 28, 1971

INVENTORS
TADAO HAYAMI,
ATSUTADA NAKATANI

BY
ATTORNEY

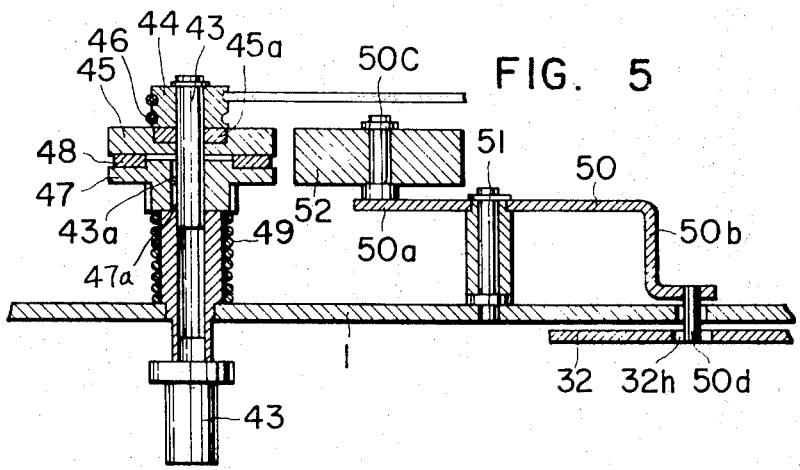
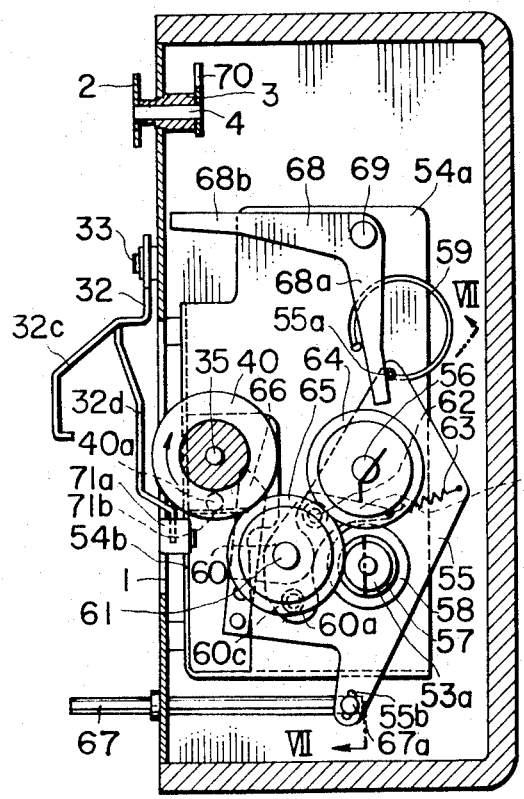
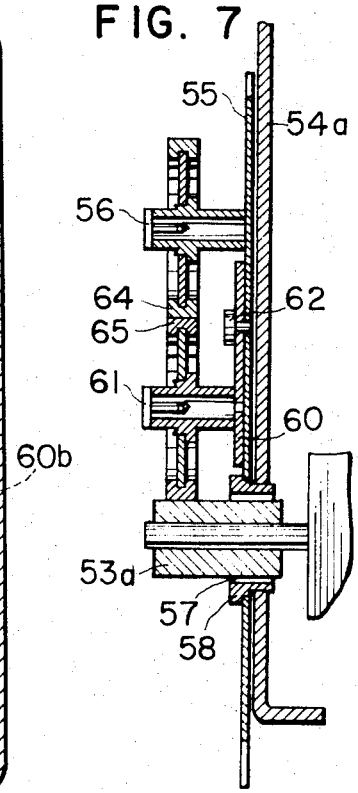

3,630,467

AUTOMATIC FILM-REWINDING DEVICE FOR PROJECTOR

BACKGROUND OF THE INVENTION

1. Field of the Invention

The present invention is concerned with an automatic film-rewinding device for sprocketless-type projectors, and more particularly, it relates to the aforesaid device which permits that, upon completion of projection, the film is quickly rewound automatically on the supply reel, and still more particularly, it is related to the automatic film-rewinding device for a sprocketless-type projector utilizing a film cartridge.

2. Description of the Prior Art

When the film is rewound in the conventional sprocketless-type projectors, it has been always necessary that the terminal end of the taken-up film be reset onto the supply reel and, furthermore, that both the pressure plate of the gate section and the claw be caused to retreat from the film face to enable the film to travel freely. Such retreating movement of both the pressure plate and the claw was performed manually in the past. For example, a rewinding knob was manipulated. Whereupon, the mechanism which is interlocked with this knob is actuated. With this, the pressure plate and the claw both of which are interlocked with said mechanism are caused to retreat from the film face. Accordingly, the operation of rewinding the taken-up film required very complicated procedure which included, in addition to said procedure for causing the retreat of both the pressure plate and the claw, the resetting of the terminal end of the taken-up film onto the supply reel. Recently, there have been placed on the market projectors of a new type utilizing film cartridges containing supply reels. With the conventional projectors of the type described, it will require all the more troublesome and complicated procedures to reset the terminal end of the taken-up film onto the supply reel upon completion of a projection. It is for these reasons that there has been desired the development of a device which eliminates the foregoing drawbacks and inconveniences of the prior art and which permits that the film already wound around the takeup reel is automatically rewound, upon completion of a projection, onto the supply reel without requiring any manual operation.

SUMMARY OF THE INVENTION

It is, therefore, the primary object of the present invention to provide an automatic film-rewinding device for use in a sprocketless-type projector, which is capable of automatically rewinding onto the supply reel quickly the film which has been wound around the takeup reel, upon completion of a projection, without requiring any manual operation.

Another object of the present invention is to provide an automatic film-rewinding device for use in a sprocketless-type projector, which is capable of performing the operation such that, upon completion of a projection, the film which has been already wound around the takeup reel is automatically rewound on the supply reel without virtually changing the path from the supply reel to the takeup reel which was followed by the film during the projection, by the actions of the members are actuated by the tension produced in the film between the claw and the supply reel to which the terminal end of the film is fixed.

Still another object of the present invention is to provide an automatic film-rewinding device for use in a sprocketless-type projector, which is operative so that both the pressure plate and the claw are caused to retreat from the film face by a mechanism which is adapted to be actuated automatically with the completion of a projection, and that, at the same time therewith, the swingable plate having two idlers is shifted in the reverse direction in its position to render the transmission of rotation of the driving motor which is adapted to rotate always in the same direction from the state in which said rotation was transmitted via one of said two idlers to the state in which the rotation of the motor is transmitted, via both of these two idlers, to the shutter shaft which is coupled to the supply reel so that the shutter shaft will be rotated in the direction reverse of that for the projection.

Other objects and a fuller understanding of the present invention can be had by referring to the following description and claims when taken in conjunction with the accompanying drawings.

BRIEF DESCRIPTION OF THE DRAWINGS

FIG. 5 is a diagrammatic fragmentary sectional view of the mechanism of the shaft portion of the supply reel taken along the line V—V in FIG. 4;

FIG. 6 is a diagrammatic sectional view of the mechanism for changing over the direction of rotation of the shutter shaft taken along the line VI—VI in FIG. 4; and FIG. 7 is a diagrammatic fragmentary sectional view, showing the relation between the motor shaft and said mechanism for changing over the direction of rotation and the idlers, taken along the line VII—VII in FIG. 6.

DESCRIPTION OF THE PREFERRED EMBODIMENT

Figure 1:
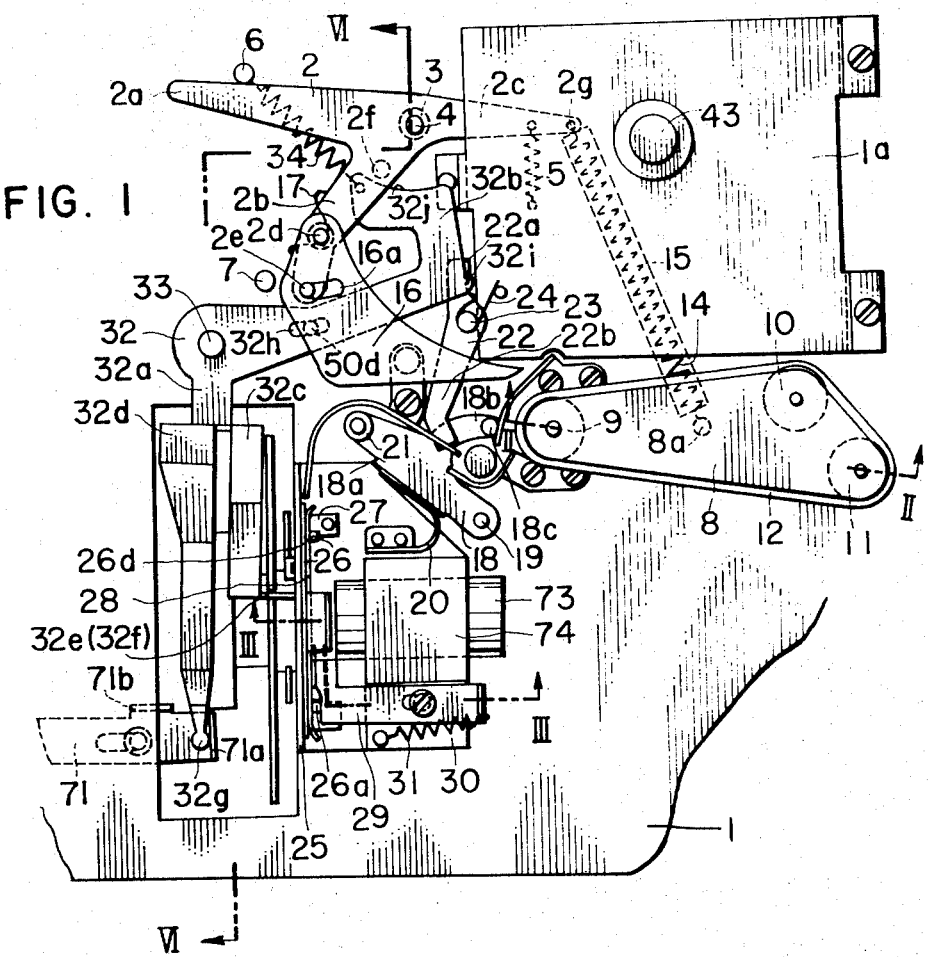
FIG. 1 is a fragmentary sectional left side elevational diagrammatic representation, with parts broken away, showing the film-guiding section and a part of the internal mechanism associated therewith in the position of projection of a sprocketless-type motion picture projector in a preferred embodiment of the present invention.
Figure 2:
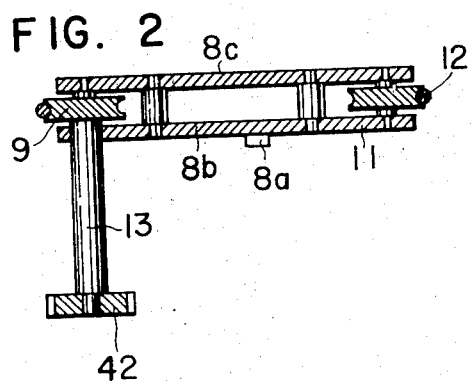
FIG. 2 is a diagrammatic sectional view taken along the line II—II in FIG. 1.
Figure 3:
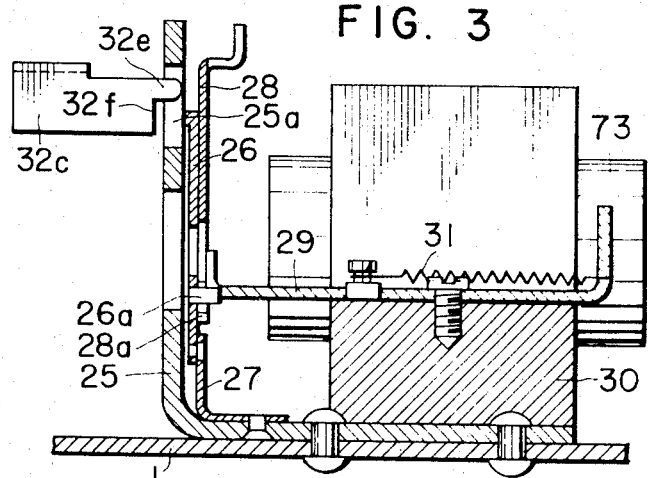
FIG. 3 is an enlarged diagrammatic fragmentary sectional view taken along the line III—III in FIG. 1.

In FIG. 1, there is shown a film-guiding section and a part of the internal mechanism associated therewith of a sprocketless-type motion picture projector. A sidewall 1 which is shown partly in section is formed in a housing (not shown) integrally therewith. A table 1a for receiving a film cartridge to be rested thereon is provided on said sidewall 1. A motion starting lever 2 is provided with three arms 2a, 2b and 2c. From one 2b of these three arms extend a shaft 2d and two pins 2e and 2f. A pin 2g extends from another arm 2c. Said motion-starting lever 2 is pivotably mounted on a shaft 4 which, in turn, is rotatably mounted on a bearing 3 attached onto the sidewall 1, said motion-starting lever 2 is caused to rotate clockwise about said shaft 4 by a spring 5. This motion-starting lever 2 is arranged so that its arm 2a can swing between two pins 6 and 7 which extend from the sidewall 1. A feeder member indicated generally at 8 which is shown in its section in FIG. 2 for being understood better is comprised of three pulleys 9, 10 and 11, plates 8b and 8c facing each other in spaced relation for receiving the shafts of these three pulleys for free rotation, and a rubber belt 12 applied to each of these three pulleys. A pin 8a extends from one 8b of said two plates. Of said three pulleys one 9 has a shaft 13 which extends into the inside of the device after passing through the sidewall 1. A toothed wheel 42 is fixed to the foremost end of said shaft 13. Said feeder member 8 is pivotably mounted on the shaft 13 and is caused to rotate counterclockwise about this shaft 13 by a spring 14 applied between the pin 8a of said plate 8b and the pin 2g of said motion-starting lever 2. Said feeder member 8 is positioned by the fact that the opposite ends of a tubular sleeve 15 which encloses the spring 14 are brought into contact with said pins 2g and 8a. A film stripper 16 has an elongated slot 16a which is formed intermediately thereof. The pin 2e of the motion-starting lever 2 is received in said elongated slot 16a. This film stripper 16 is pivotably mounted, at one end thereof, on the shaft 2d of said motion-starting lever 2 and this film stripper 16 is caused to rotate counterclockwise about said shaft 2d by a spring 17. A tension lever 18 is provided with two arms 18a and 18b and is pivotably mounted on a shaft 19 extending from said sidewall 1 and is caused to rotate clockwise about said shaft 19 by a spring 20. A roller 21 is rotatably mounted at the foremost end of one 18a of these two arms, whereas a pin 18c extends from the foremost end of the other arm 18b. A locking lever 22 is provided with two arms 22a and 22b, and it is pivotably mounted on a shaft 23 extending from the sidewall 1 and is caused to rotate counterclockwise about said shaft 23 by a spring 24. Said arm 22a is provided with a bent portion which is formed at the foremost end thereof. Said locking lever 22 is arranged so that its arm 22b is located within the path of movement of the pin 18c of the aforesaid tension lever 18. A gate baseplate 25 is shown in its section in FIG. 3 to facilitate better understanding. This gate plate 25 is of an L-shaped configuration and is fixed to the sidewall 1 at one face of the gate baseplate. An elongated slot 25a is formed in the other face of the gate baseplate 25. A gate plate 26 is secured, under pressure, to said gate baseplate 25 by leaf springs 27 which, in turn, are attached to the end portion of the gate plate 26. A pin 26a extends from the gate plate 26. A pressure plate 28 is provided with an opening 28a formed therein. The pin 26a of the gate plate 26 is received in said opening 28a. Another pin 26b extends from the gate plate 26. This pin 26b is received in another opening which is formed in the pressure plate 28 in the manner same as the first opening 28a. An urging plate 29 is attached to a member 30 secured to the sidewall 1 in such a way as to be able to move sideways on the drawing. This urging plate 29 urges said pressure plate 28 against the gate plate 26 by a spring 31. A lever 32 is provided with two arms 32a and 32b and is pivotably mounted on a shaft 33 extending from the sidewall 1 and it is caused to rotate counterclockwise about said shaft 33 by a spring 34. The arm 32a is divided, intermediately thereof, into two portions to form legs 32c and 32d. The leg 32c has stepped portions 32e and 32f which are formed at the foremost end portion of the leg 32c. This is clearly shown in FIG. 3. These stepped portions 32e and 32f pass through the elongated slot 25a of the gate baseplate 25 and is adapted to engage the pressure plate 28 and the gate plate 26, respectively. On the other hand, the foremost end portion 32g of the leg 32d engages a bent portion 71a of a slidable plate 71. The other arm 32b of the lever 32 is provided with an elongated slot 32h formed therein. This arm 32b is provided, formed intermediately thereof, with a hook 32i which is adapted to engage the bent portion formed at the foremost end of the arm 22a of the locking lever 22. At the foremost end portion of the arm 32b of said lever 32, there is formed a curved face portion 32j which is adapted to engage the pin 2f of the motion-starting lever 2.

Figure 4:
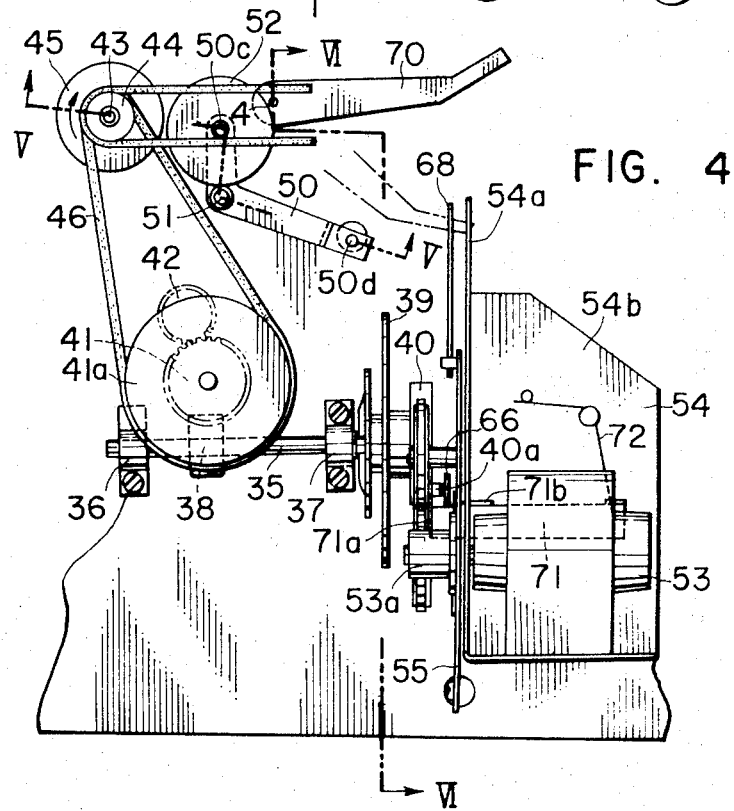
FIG. 4 is a diagrammatic fragmentary representation of said projector, showing the internal mechanism on the right side of the projector in its position of projection.

Referring now to FIG. 4, there is shown a part of the internal mechanism of the projector. A shutter shaft 35 is supported by bearings 36 and 37 which are attached to the sidewall 1 integrally therewith. A roller 40 having a worm 38, a shutter blade 39 and a pin 40a is securely mounted on the shutter shaft 35. A toothed wheel 41 meshes with said worm 38, and this toothed wheel 41 is formed integrally with a pulley 41a. A toothed wheel 42, as stated previously, is secured to the shaft 13, and this toothed wheel 42 meshes with the toothed wheel 41. A supply reel shaft 43 is provided with a rotatable pulley 44 and also a rotatable disk 45. A belt 46 is applied between said pulley 41a and the rotatable pulley 44.

In FIG. 5, there is shown a mechanism associated with the supply reel shaft 43. A clutch section 45a is provided with a ratchet mechanism which is capable of transmitting to the disk 45 only the rotation effected in the direction of the arrow shown in FIG. 4 during the periods of reverse rotation and rewinding action. A disk 47 is of a diameter identical with that of the disk 45 and is of a key groove 47a formed therein. This key groove 47a engages a key 43a which extends from the supply reel shaft 43. Accordingly, the disk 47 is movable in the direction of the axis of the supply reel shaft 43, whereas it is moved integrally with this supply reel shaft 43 in the direction of rotation. A frictional member 48 is formed with a feltlike material and it is interposed between the disk 45 and the disk 47. An urging spring 49 urges the disk 47 against the disk 45 via the frictional member 48. As will be clearly understood by referring to FIG. 4, a lever 50 is provided with two arms 50a and 50b, and it is rotatably mounted on a shaft extending from the sidewall 1. A shaft 50c extends from the foremost end portion of the arm 50a. An intermediate roller 52 having its peripheral portion formed with a resilient material such as rubber is rotatably mounted on said shaft 50c. A pin 50d extends from the foremost end portion of the other arm 50b. As will be clearly understood by referring to FIG. 1, said pin 50d passes through the sidewall 1 and engages the elongated slot 32h of the lever 32. Accordingly, when said lever 32 has been moved counterclockwise in FIG. 1, the external periphery of the intermediate roller 52 is brought into contact with the respective external peripheries of both the disk 45 and the disk 47 simultaneously. A roller 53a is securely mounted on the shaft of the driving motor 53. A baseplate 54 for the driving motor 53 is provided with sidewalls 54a and 54 b. Said driving motor 53 is attached to the baseplate 54. This baseplate 54 is fixed to the sidewall 1 by utilizing the sidewall 54b of said baseplate 54.

In FIGS. 6 and 7, there is shown a mechanism for changing over the direction of rotation of the shutter shaft 35. A swingable plate 55 is swingably supported by an eyelet 58 which is fixed at the sidewall 54a of said baseplate 54 and is provided with an opening 57 for thrusting said roller 53a of the driving motor 53 therethrough.

In FIG. 6, a pin 55a having a through hole is provided at the upper end portion of the swingable plate 55. Between this pin 55a and the baseplate 54 is applied a ringlike spring 59. Accordingly, said swingable plate 55 is urged in one of the directions, namely, clockwise or counterclockwise, about its axis of rotation. A bearing plate 60 is provided with two arms 60a and 60b, and has a shaft 61 extending in the central portion thereof. Said bearing plate 60 which has an elongated slot 60c formed in the arm 60a is mounted, for pivotal movement relative to the swingable plate 55, on a pin 62 extending from said swingable plate 55. The other arm 60b is pulled by a spring 63 which has one end fixed to said swingable plate 55. Idlers 64 and 65 are rotatably mounted on a shaft 56 extending from said swingable plate 55 and on the aforesaid shaft 61, respectively. Said idler 65 is caused to be in tight contact with both of said idler 64 and said roller 53a by the action of the spring 63. Furthermore, said idler 65 is arranged so that it is rendered to the state of pressure contact also with the roller 40 which is provided integrally with said shutter shaft 35. A leaf spring 66 is fixed to the swingable plate 55. The free end of this leaf spring 66 is arranged so that it is able to enter into the path of travel of the pin 40a of said roller 40. Also, there is formed an elongated slot 55b in the lower end portion of the swingable plate 55. This elongated slot 55b engages a pin 67a extending from a rod 67 which, in turn, passes through the sidewall 1. A lever 68 is provided with two arms 68a and 68b, and it is pivotably mounted on a shaft 69 extending from the sidewall 54a of the baseplate 54. One 68a of these two arms engages said pin 55a having a through hole of said swingable plate 55, whereas the other 68b of the two arms is arranged so that it can enter into the path of travel of a lever 70 which is fixed to an end portion of the shaft 4 rotatably mounted in the bearing 3 and which is arranged so as to move integrally with the motion-starting lever 2. As will be understood clearly be referring to FIGS. 1, 4 and 6, a slidable plate 71 is provided with bent portions 71a and 71b, and it is attached to the sidewall 54b of the baseplate 54 in such a way that it is movable in the horizontal direction, and moreover, this slidable plate 71 is always pulled toward the right side, in FIG. 4, by a spring 72. One 71a of the two bent portions engages the foremost end portion 32g of the leg 32d of the lever 32, whereas the other 71b of the two bent portions engages the aforesaid leaf spring 66. A projection lens 73 is attached to a lens housing 74 which is provided integrally with the sidewall 1.

Next, description will be directed to the function of the device having the foregoing structure. As shown in FIG. 1, let us now assume, in the state of a normal projection, that the projection has been completed and that the film which was initially wound around the supply reel has now been withdrawn entirely from said reel. Since the terminal end of the film is secured to the supply reel, whereas the claw is still actuated to tend to pull the filmstrip toward its own side, the roller 21 is pushed by the film which has now become tensioned. By virtue of this, the tension lever 18 is forced to rotate counterclockwise against the force of the spring 20. Accordingly, the pin 18c which is formed integrally with said tension lever 18 pushes the arm 22b of the locking lever 22, so that this locking lever 22 is caused to rotate clockwise against the force of the spring 24. As a result, the bent portion of the arm 22a of the locking lever 22 releases the locked hook 32i of the lever 32. Accordingly, the lever 32 is caused to rotate counterclockwise by the action of the spring 34. As a result, the stepped portion 32e formed at the foremost end of the leg 32c of the lever 32 pushes the pressure plate 28 (see FIG. 3) to produce a gap between the pressure plate 28 and the gate plate 26, so that the film is relieved of the pressure force which has till then been applied thereto by the pressure plate 28. Subsequently, the stepped portion 32f formed at the foremost end of the leg 32c of the lever 32 pushes the gate plate 26 to relieve the film of its engagement with the claw also. At the same time therewith, the foremost end portion 32g of the gate 32d of the lever 32 pushes the bent portion 71a of the slidable plate 71, so that the other bent portion 71b pushes the leaf spring 66 into the path of travel of the pin 40a of the roller 40 (see FIG. 6).

In FIG. 6, the roller 40 rotates in the direction of the arrow shown therein. Accordingly, the pin 40a pushes the leaf spring 66 to shift, toward the right side, the position of the swingable plate 55 which is integral with the leaf spring 66. As a result, the idler 65 is parted from the roller 40 and the idler 64 is brought into contact with said roller 40. Accordingly, the direction of rotation of the shutter shaft 35 is reversed. In FIGS. 4 and 5, the rotational movement of the shutter shaft 35 causes also the pulley 44 to rotate in the direction of the arrow shown therein. Therefore, owing to the action of the clutch section 45a, the disk 45 is brought into engagement with the pulley 44, and said disk 45 starts rotation. The lever 32, on the other hand, is in engagement with the pin 50d of the lever 50 by the elongated slot 32h of the lever 32 (see FIG. 1), so that the lever 50 is caused to rotate counterclockwise in FIG. 4, resulting in that the intermediate roller 52 is brought into contact with both of disks 45 and 47 simultaneously. Accordingly, the disk 47 is rotated integrally with the disk 45, and the supply reel shaft 43 which is keyed to the disk 47 is also rotated quickly in the direction of rewinding. Thus, automatic rewinding of the film is performed. In order to start the projection, the motion-starting lever 2 is turned counterclockwise first. Whereupon, the pin 2f which is fixed to the motion-starting lever 2 pushes the curved face portion 32j of the lever 32 to rotate this lever 32 clockwise to thereby produce a tension in the spring 34, and at the same time, both the gate plate 26 and the pressure plate 28 are relieved of their engagement with the stepped portions 32f and 32e formed at the foremost end of the leg 32c of the lever 32, to return to the positions assumed by them during the initial projection. At this moment, the lever 32 is locked at its hook 32i by the engagement of the latter with the locking lever 22. Simultaneously therewith, the lever 70 which is integral with the motion-starting lever 2 by means of the shaft 4 pushes the arm 68b of the lever 68 to rotate this lever 68 (see FIG. 6). Accordingly, owing to this movement of the lever 68, the other arm 68a of the lever 68 is caused to push the pin 55a having a through hole. As a result, the swingable plate 55 is caused to shift in its position toward the right side by the action of the spring 59. Accordingly, the swingable plate 55 is caused to return to the position shown in FIG. 6 to thereby return the mode of rotation of the shutter shaft 35 to that of the normal projection. Whereupon, the projector will resume its normal state of projection. During this operation, the disk 45 is not allowed to rotate owing to the action exerted by the clutch section 45a. As a result, the supply reel shaft 43 is retained to be stationary, and there will occur no slackening of the film. In case, however, there is present an intensive internal friction of the clutch section 45a, it may be considered that there takes place the interlocked movement between the pulley 44 and the disk 45. Such a problem may be solved by appropriately providing a control means on the disk 45. It should be noted, however, that even in case the disk 45 is stationary, the disk 45 is frictionally united to the disk 47 and that, therefore, one cannot avoid the rotation of the supply reel shaft 43 which is caused by the fact that the reel itself is rotated for the respectively amounts of feeding of the film. It should be understood also that the film stripper 16 and the feeder member 8 are both intended for withdrawing the film located in the cartridge. The actions of these members are identical with those described in the specification of the U.S. Pat. No. 3,429,518, and therefore, their description is omitted.

We claim:

1. An automatic film-rewinding device in a sprocketless-type projector containing a claw for intermittently feeding film, a pressure plate for urging the film against a gate plate, and a supply reel mounted on a shaft adapted to be rotated by following the direction of rotation of a shutter shaft and having the terminal end of the film secured thereto, and being adapted to be driven by a driving motor adapted to rotate only in one direction, said device comprising:

a tension member adapted to engage the film between the supply reel and the gate and capable of swinging to absorb the tension produced in the film between said supply reel and said gate when the claw forces the film to travel downwardly by its engagement therewith, main member adapted to be relieved of its locked condition by the swinging movement of said tension member and capable of pushing both the gate plate and the pressure plate by virtue of its rotation resulted from said relief of the main member from its state of being locked to thereby set the film free from the claw, the gate plate and the pressure plate, a first idler adapted to engage the shaft of the driving motor, a second idler adapted to engage said first idler, a movable member capable of being moved by virtue of the rotation of said main member, a swingable member provided with said first idler, said second idler and said movable member a spring attached to said swingable member for bias of said swingable member in two opposite directions, and a roller fixed to the shutter shaft and having, on a side face, a projection adapted to engage said movable member whenever said movable member is moved and adapted to engage said first idler whenever the position of said swingable member is shifted in one of the two opposite directions and adapted to engage said second idler whenever the position of said swingable member is urged in the other of the two directions.

2. An automatic film-rewinding device according to claim 1, in which said device further comprises a locking lever adapted to lock said main member and to relieve the latter member of its state of being locked by virtue of the engagement of said locking lever with said tension member caused by the swinging movement of this tension member.

3. An automatic film-rewinding device according to claim 1, in which said device further comprises a slidable plate adapted to engage said main member and capable of moving said movable member as a result of the engagement of the slidable plate with the main member caused by the rotation of the main member.

4. An automatic film-rewinding device according to claim 1, in which said movable member is a leaf spring.

* * * * *

UNITED STATES PATENT OFFICE
CERTIFICATE OF CORRECTION

Patent No. 3,630,467            Dated December 22, 1971

Inventor(s)  Tadao Hayami, et al

It is certified that error appears in the above-identified patent and that said Letters Patent are hereby corrected as shown below:

On the cover sheet insert -- [45] Patented Dec. 28, 1971 --.

Signed and sealed this 17th day of October 1972.

(SEAL)
Attest:

EDWARD M. FLETCHER, JR.                ROBERT GOTTSCHALK
Attesting Officer                       Commissioner of Patents